United States Patent Office 3,475,177
Patented Oct. 28, 1969

3,475,177
CHOLINE COMPOSITION
Lawrence R. Jones, Terre Haute, Ind., assignor to Commercial Solvents Corporation, New York, N.Y., a corporation of Maryland
No Drawing. Filed Feb. 9, 1966, Ser. No. 526,067
Int. Cl. A23k 1/00
U.S. Cl. 99—2                                  6 Claims

ABSTRACT OF THE DISCLOSURE

A process for producing a choline-fat composition being resistant to caking by deposition from a liquid medium which is a solvent for the fat alone, or both the fat and the choline salt. Deposition is carried out by either chilling or evaporation of the liquid medium yielding a composition in particulate form. Suitable solvents include alcohols, such as ethyl and isopropyl, chlorinated solvents such as chloroform on trichloroethane, or aliphatic hydrocarbons such as hexane and octane. The composition may also also contain a carrier such as corn glutin meal, wheat middlings or ground corn cobs.

---

This invention relates generally to improved choline compositions. In a particular aspect it relates to choline salt and fat compositions.

Choline salts are useful components of animal feeds. They are particularly useful in poultry feeds having a high fat content, e.g. a poultry feed having a fat content of above about 10%. One of the nutritional functions of choline is concerned with the metabolism and transportation of fat.

A choline salt intended for use in animal feeds is usually supplied to the feed manufacturer in the form of a choline feed supplement prepared by mixing the choline salt with one or more of the dry ingredients of the feed preparation to act as a carrier. A convenient method of preparation is to spray an aqueous solution of the choline salt, e.g. choline chloride, on the dry ingredients followed by drying.

The choline supplement is advantageously shipped and stored in paper bags. However, choline salts acceptable for use in feeds have the inherent disadvantage of being highly hygroscopic, and it is characteristic of choline supplements that if absorption of moisture occurs, the bag contents set up to a hard cake. This hard cake is objectionable to the feed manufacturer because it must be finely ground again before incorporation in the feed. Consequently, specially lined bags must be used and care must be taken during shipment and storage to prevent absorption of moisture.

To avoid the necessity for drying the feed after spraying the dry ingredients with the aqueous choline salt solution, Lorz, U.S. Patent 2,907,911 provided a mixture of fatty acid salts of choline and fat which could be mixed with the dry feed ingredients. The choline-salt-fat mixture was prepared in the proper proportion for use in the feed, namely with about 1% of choline with respect to the weight of the fat. According to this method, a reactable choline compound, i.e. either choline base or a choline salt of an acid weaker than fatty acids, was mixed with fat containing from 5%–50% free fatty acids and heated until the fat melted whereupon the choline reacted with the fatty acids present in the fat. This process provided choline salts of fatty acids dispersed in molten fat, which was then either cooled for use as a feed supplement ingredient, or was mixed directly into dry feed materials in the proper proportion.

Lorz also disclosed that the dispersion of choline compounds in fats without reaction and incorporation into the feed may in some instances be accomplished but reported that such preparations are unsatisfactory. However, no indication was given as to how the dispersion is accomplished nor why such preparations are unsatisfactory.

It is an object of this invention to provide improved choline compositions.

Another object of this invention is to provide choline salt and fat compositions wherein the choline salt is substantially uniformly dispersed in the fat.

Another object is to provide choline animal feed supplements resistant to caking.

Other objects will be obvious to those skilled in the art from the disclosure herein.

It has been discovered that a choline feed supplement containing a choline salt composition consisting essentially of a choline salt and a fat is resistant to caking following moisture absorption. The choline salt and fat are in a proportion by weight of from about 25% of the choline salt and 75% of the fat to about 95% of the choline salt and about 5% of the fat.

It has also been discovered that a combination of a choline salt and a fat, prepared by deposition from a liquid medium which is at least a solvent for the fat, is resistant to caking, due to moisture absorption when employed with a carrier in a choline feed supplement.

Generally, in preparing the combination of this invention, the choline salt is prepared in substantially anhydrous form by any method known to those skilled in the art, for example, the method of Klein, U.S. Patent 2,870,198, or from aqueous solution by azeotropic distillation as described below. The salt is then dispersed in a suitable liquid medium which is a fat solvent and can be, but not necessarily, a solvent for the choline salt. A suitable fat is dissolved in the solvent and the choline-salt-fat combination of this invention is obtained by deposition.

Deposition of the choline-salt-fat combination can be effected by evaporation of the liquid medium, preferably with agitation, either at atmospheric pressure or reduced pressure, whereby the choline salt and fat are deposited in intimate admixture. This method of deposition is especially useful when the liquid medium is not a solvent for the choline salt. When the liquid medium is a solvent for the choline salt, depositions can be effected by evaporation as just described, or it can be effected by coprecipitation at low temperatures of the choline salt-fat combination.

In one embodiment of this invention, the choline salt and the fat are dissolved in the solvent in the desired ratio and the carrier ingredients are added in an amount to provide the desired choline concentration in the feed supplement, forming a slurry. The mixture is then chilled and when deposition of the choline-salt-fat combination is adjudged complete, the mixture is filtered. The filter cake is dried to form a free-flowing, particulate solid.

For a carrier, any of the dry ingredients, or mixture thereof, customarily employed in animal feeds can be used. Generally, inexpensive ingredients such as corn gluten meal, wheat middlings, ground corn cobs, soybean mill feed or solvent extracted soybean meal are preferred. The amount of carrier employed is preferably held to a minimum consistent with good handling properties. Generally the amount of carrier to be used is selected to provide a choline salt, e.g. choline chloride, content of from about 20% to about 70% by weight, preferably from about 25% to about 60% by weight.

The ratio of choline salt to fat may be varied in accordance with the season and the particular end use. Generally a range of from about 25% to about 95% by weight choline salt is used, that is, from about 0.33 part by weight of the choline salt per part of the fat, preferably from about 35% to about 80% of choline salt is used. A 1:1 by weight ratio is a convenient combination, and as described below, a combination having choline chloride content in the range of 70 to 75% by weight and a fat content in the range of 25–30% is preferred. After preparation, the combination is suitable for use as an animal feed ingredient and can be used immediately or stored until needed. The choline salt-fat combination of this invention does not contain sufficient fat that the combination can replace all of the fat required for balanced animal feed. Accordingly, it is usually preferred to add additional fat to the formula.

The choline salts useful in the practice of this invention can be salts of choline and an acid not weaker than a fatty acid, including but not limited to, hydrochloric, salicylic, tartaric, lactic, acetic, propionic and phosphoric.

The choline chloride, choline salicylate, choline tartrate, choline lactate and choline phosphate are preferred salts. Choline chloride is a specifically preferred salt because of its ease of manufacture. The salt employed should be acceptable for the intended use, e.g. in animal nutrition or in the practice of pharmacy.

The fat which is suitable for the practice of this invention is any fat which is normally solid at room temperature, and preferably relatively free from free fatty acids, e.g. having less than 5% by weight of free fatty acids, and which does not melt at the maximum storage temperatures ordinarily encountered. Softening of the fat during storage is not objectionable, but melting to the extent that the fat can drain away from the choline salt would defeat the objects of this invention. Fatty acids are those acids resulting from the hydrolysis of fats, i.e., those containing straight, saturated carbon chains of from 4 to 30 carbon atoms and straight, unsaturated carbon chains of from 10 or more carbon atoms.

Such a fat can be an animal fat, e.g. tallow (beef fat), sheep and lamb fat, and lard (pork fat), or it can be hydrogenated vegetable fat having a melting range similar to animal fat. Tallow, especially hydrogenated tallow, is a preferred fat because of its high titer. The quality should be acceptable to animal feed manufacturers.

The liquid medium from which the combination of this invention is deposited can be any solvent for the animal fat. Advantageously, but not necessarily, the liquid medium is also a solvent for the choline salt. The liquid medium employed in the practice of this invention should be of good quality so that no undesirable contaminates are introduced by its use and it should be substantially anhydrous, e.g. containing less than about 1% by weight of water. Alcohols such as ethanol, isopropyl alcohol, and butanol are useful, and isopropyl alcohol is a preferred solvent. Other useful solvents include chlorinated solvents such as chloroform, methylene chloride, trichloroethane and aliphatic hydrocarbons such as hexane, heptane, octane, and the like.

In a preferred embodiment of this invention, anhydrous choline chloride 70 parts and tallow 30 parts are dissolved in anhydrous isopropyl alcohol. The resulting solution is chilled to from $-10°$ C. to $+10°$ C., preferably 0 to 5° C. A co-precipitate is obtained which is separated from the isopropyl alcohol by filtration. The co-precipitate forms a preferred combination having from 70–75 parts by weight of choline chloride and 25–30 parts by weight of tallow.

The choline salt-fat composition of this invention is preferably provided in particulate form. Accordingly, when the process provides the composition in a large mass or chunks, these are preferably comminuted.

Preparation of anhydrous choline chloride

Choline chloride was prepared as a 70% aqueous solution by reacting trimethylamine hydrochloride with ethylene oxide according to known methods. A 1330 g. portion of this solution was placed in a 5-liter flask along with approximately 3400 ml. of butanol. A distillation column, 4 feet long, packed with glass helices and equipped with a decanter head was attached. Heat was applied and the water-butanol azeotrope was distilled until the vapor temperature reached 117° C. Approximately 400 ml. of water was removed.

The butanol-choline chloride mixture was cooled overnight to effect crystallization. Then the butanol was drained from the crystals by inverting the flask over a container of butanol such that the neck was underneath the liquid level in order to protect the crystals from the air and moisture. After the butanol had drained off, 2400 ml. of anhydrous isopropanol was added to the flask and the mixture was heated until all crystals dissolved. The solution was then transferred to a 4-liter Erlenmeyer flask and allowed to cool overnight to develop crystals. The crystals were filtered, immediately washed and dried with acetone. The crystals were then dried under vacuum in an oven at 60° C., and were stored in a sealed polyethylene bag for use in the preparation of the combination of this invention.

Following are examples which illustrate the practice of this invention.

EXAMPLE 1

Preparation of choline chloride-tallow combination

To 320 g. of substantially anhydrous isopropanol at 60° C. was added 15 grams of flaked tallow and 35 grams of the anhydrous choline chloride crystals. When the tallow and crystals were dissolved, the solution was cooled in and ice bath. The precipitate was filtered and dried in a vacuum oven at 40° C. The combination sought was 70% choline chloride, 30% tallow. By assay, the combination obtained was 72% by weight choline chloride, 28% tallow. The choline chloride was uniformly dispersed in the tallow.

The choline chloride-tallow combination was employed in a choline supplement for use in an animal feed composition and the tallow was included in calculating fat content. The supplement containing the choline chloride-tallow combination showed little tendency to cake during storage, although a similar supplement formulated with choline chloride containing no tallow caked seriously.

EXAMPLE 2

Using anhydrous choline chloride prepared as previously described, the general procedure for preparing the combination of this invention was repeated using 5 g. of tallow and 45 g. of choline chloride. The product obtained assayed 88% by weight of choline chloride, 90% expected. An animal feed supplement containing this combination as a choline source showed no caking tendency during storage.

EXAMPLE 3

Flaked tallow, 15 g. was dissolved in methylene chloride, 400 ml., 35 g. of anhydrous choline chloride was added, but although it dispersed in the liquid medium, it did not dissolve. The mixture was transferred to a rotary evaporation flask and the solvent was removed by evaporation under reduced pressure while the flask was rotated. When the solvent was completely evaporated, an intimate admixture of tallow, 30%, and choline chloride, 70%, was obtained. It was characterized as consisting of crystals of choline chloride coated with tallow.

The product obtained in this manner is used in the preparation of a choline feed supplement. Such a supplement possesses improved resistance to caking by comparison with a supplement formulated with fat-free choline chloride.

EXAMPLE 4

Choline chloride 35 g., and tallow, 15 g., were dissolved in 300 ml. of anhydrous isopropyl alcohol at 60° C. To this was added 20 g. of a mixture of 50% ground corn cobs as a carrier to form a slurry. The mixture was cooled with agitation to between $-10°$ C. and $+10°$ C.

and the choline chloride and tallow precipitated from solution. The solids were filtered and dried. The resulting product consisted of approximately 50% choline chloride and about 20% fat deposited on the carrier, about 30%. It remained free flowing even though exposed to absorption of atmospheric moisture.

What is claimed is:

1. A process for the production of a particulate combination resistant to caking of a choline salt with a normally solid fat comprising dissolving said fat in a liquid medium fat solvent, dispersing said choline salt in said liquid medium in an amount of from about 0.33 part to about 19 parts by weight per part of fat and recovering said combination from said fat solvent in particulate form.

2. The process of claim 1 wherein the liquid medium is a solvent for both the choline and the fat and the choline salt and fat combination is recovered by co-precipitation from said solvent at a temperature of from about $-10°$ C. to about $+10°$ C.

3. The process of claim 1 wherein the liquid medium is a solvent for both the choline salt and the fat and the choline salt and fat combination is recovered by evaporation of the solvent.

4. The process of claim 1 wherein the choline salt is suspended in the liquid medium, and the choline salt and fat combination is recovered by evaporation of the solvent.

5. A process for the production of a particulate combination resistant to caking of choline chloride and tallow having a composition of from about 68–72% by weight of choline chloride and 32–28% by weight of tallow, comprising dissolving 35 parts by weight of substantially anhydrous choline chloride and 15 parts by weight of tallow in 320 parts by weight of substantially anhydrous isopropyl alcohol, chilling the solution thereby produced to a temperature of from about $-5°$ C. to $+5°$ C. to effect co-precipitation of the said choline chloride and tallow combination and recovery thereof by filtration in particulate form.

6. In a process for the manufacture of a particulate animal feed supplement resistant to caking containing inter alia a carrier and a choline salt, the steps comprising dissolving a choline salt and a fat in a solvent therefor, slurrying therein said carrier, reducing the temperature to within a range of from about $-10°$ C. to about $+10°$ C. to precipitate the choline chloride and fat and filtering said feed supplement thereby providing said feed supplement in particulate form.

References Cited

UNITED STATES PATENTS

| 2,703,285 | 3/1955 | Luther | 99—2 |
| 2,870,198 | 1/1959 | Klein et al. | 260—501.15 |
| 2,970,911 | 2/1961 | Lorz. | |

OTHER REFERENCES

Balloun, Poultry Sci., vol. 35, pp. 737–739, 1956.

A. LOUIS MONACELL, Primary Examiner

NORMAN ROSKIN, Assistant Examiner

U.S. Cl. X.R.

99—4; 424—329